United States Patent [19]
Slikker

[11] Patent Number: 4,773,526
[45] Date of Patent: Sep. 27, 1988

[54] SCRAPER DEVICE FOR FITTING TO A CONVEYOR BELT

[75] Inventor: Dick Slikker, Ede, Netherlands

[73] Assignee: HCC Ede B.V., Ede, Netherlands

[21] Appl. No.: 60,854

[22] Filed: Jun. 12, 1987

[30] Foreign Application Priority Data

Dec. 5, 1986 [NL] Netherlands ............... 8603103

[51] Int. Cl.$^4$ .............................................. B65G 45/00
[52] U.S. Cl. ................................... 198/497; 198/499; 15/256.5
[58] Field of Search ................. 198/497–499; 15/256.5, 256.51

[56] References Cited

U.S. PATENT DOCUMENTS

| 3,952,863 | 4/1976 | Schattauer | 198/499 |
| 3,999,649 | 12/1976 | Andersson | 198/499 |
| 4,053,045 | 10/1977 | Reiter | 198/499 |
| 4,344,525 | 8/1982 | Bancroft et al. | 198/499 |
| 4,533,037 | 8/1985 | Kerr | |
| 4,633,999 | 1/1987 | Perneczky | 198/499 |

FOREIGN PATENT DOCUMENTS 2365415 12/1974 Fed. Rep. of Germany .
7802443 3/1978 Netherlands .
2125357 3/1984 United Kingdom .

Primary Examiner—Robert J. Spar
Assistant Examiner—Lyle Kimms
Attorney, Agent, or Firm—Cushman, Darby & Cushman

[57] ABSTRACT

A scraper device for fitting to an endless conveyor belt or similar device, comprising of a set of scraper elements (1, 1') supported by an elongate carrier member. The scraper elements (1, 1') are mounted on at least one bar-like member (2, 2') which extends parallel to the carrier member and rests on the upper face of the carrier member. The bar like member is fastened relative to the carrier member by detachable fasteners (8, 9; 10, 11, 12) which are mounted at the ends of the bar-like member. Preferably the fasteners are formed by at least one pin (9) projecting from a side edge of the carrier beam (7) and at least one recess formed in the bar-like member (2, 2') in which recess the pin is received and by an upstandiong flange (10) which is provided with an opening. The upstanding flange lies next to a flange formed on the carrier beam which is also provided with an opening. A securing fastener is inserted through the respective coinciding openings in the flanges.

4 Claims, 1 Drawing Sheet

SCRAPER DEVICE FOR FITTING TO A CONVEYOR BELT

FIELD OF THE INVENTION

The invention relates to a scraper device for fitting to an endless conveyor belt or similar device, said scraper device consisting of a set of scraper elements each of which has a scraper blade and which lie substantially next to one another and are supported by an elongate carrier member which extends transversely of the longitudinal direction of the conveyor belt and can be mounted on the frame of the conveyor belt in such a manner that the scraper blades of the scraper elements can come to lie with their free edges against the lower face of the lower run of the conveyor belt. A scraper device of this kind is known from the Dutch Patent application No. 7802443.

BACKGROUND OF THE INVENTION

In the known scraper device the scraper elements are mounted directly on the elongate carrier member, so that whenever a scraper element has to be replaced in a scraper device mounted on a conveyor belt, for example because its scraper blade has worn, the element in question must be removed from the carrier member, which is a troublesome and time-consuming operation because access to the scraper device is difficult on account of the conveyor belt situated above it, while in addition the scraper elements are heavily soiled and consequently scarcely visible. A new scraper element must then be mounted, and this also takes considerable time, so that the whole replacement operation takes a great deal of time, during which the conveyor belt is out of action.

SUMMARY OF THE INVENTION

The invention seeks to provide a scraper device of the type described, which is exempt from this disadvantage.

This aim is achieved in that in the scraper device according to the invention the scraper elements are mounted on at least one bar-like member which extends parallel to the carrier member and rests on the upper face of the carrier member, and which is fastened relative to the carrier member by means of detachable fastening means which are mounted at the ends of the bar-like member.

For the purpose of replacing one or more scraper elements in a scraper device constructed in this manner, the entire bar-like member together with the scraper elements mounted on it can be removed rapidly and in a simple manner because only the readily accessible fastening means situated at the side edges of the conveyor belt have to be detached, and a new bar-like member together with the scraper elements fastened on it can then be mounted on the carrier member, likewise rapidly and in a simple manner, so that the conveyor belt has to lie idle only for a very short time.

The scraper elements are preferably divided into two groups and mounted on two bar-like members resting on the upper face of the carrier member and lying in line with and next to one another, while the fastening means, at the mutually facing ends of the bar-like members, are formed each by at least two elements which are formed respectively on the carrier member and on the bar-like member and which interengage in such a manner that a relatively slight displacement of a bar-like member in a direction away from the element formed on the carrier member will enable the elements to be brought out of engagement with one another, and the other fastening means at the mutually remote ends of the bar-like members are each so constructed that the afore-said slight displacement of a bar-like member is possible only after the other fastening means has been detached.

In this way, for the purpose of replacing a scraper element only one fastening means has to be detached, while in addition the respective bar-like member can thereupon be removed more easily.

The carrier member is advantageously formed by a beam having a rectangular section, and each bar-like member is advantageously formed by a bar having a U-shaped cross-section, this bar engaging around the upper side of the carrier member with the legs of the U directed downwards.

In this arrangement the elements of the fastening means at the mutually facing ends of the bar-like members are preferably formed respectively by at least one pin projecting from a side edge of the carrier beam and by a recess formed in a leg of the U, starting from the end face, in which recess said pin is received, while the other fastening means, at the mutually remote ends of the bar-like members, are each formed by an upstanding flange which is formed on the bar-like member, is provided with an opening, and lies next to a flange formed on the upper face of the carrier beam and provided with an opening, and by a securing means inserted through the coinciding openings in the flanges.

BRIEF DESCRIPTION OF THE DRAWINGS

The invention will be described more fully below with reference to the example of embodiment shown in the drawing, in which.

DETAILED DESCRIPTION OF THE PREFERRED EMBODIMENT

Figure 1:
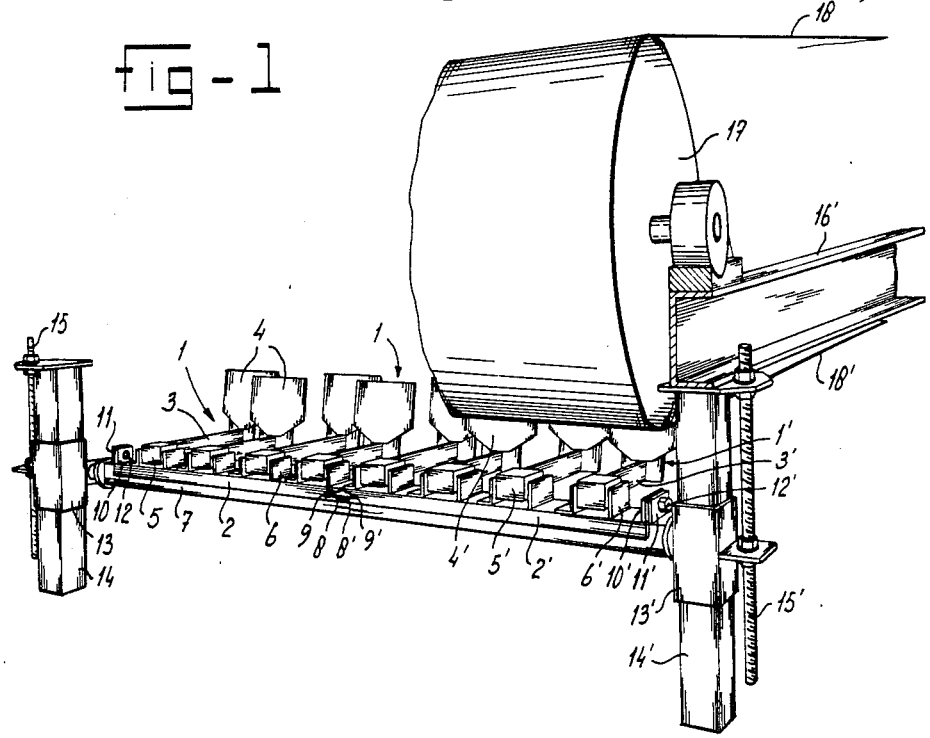
FIG. 1 shows in perspective a scraper device according to the invention, mounted on the frame of a conveyor belt.

As shown in the drawing, the scraper device comprises a set of scraper elements 1 and 1', which are divided into two groups and mounted on two bar-like members 2, 2' of U-shaped section. Each scraper element 1, 1' consists of an arm 3, 3' and a scraper blade 4, 4' projecting from said arm. Each arm 3, 3' is swivellably mounted, by means of a rubber torsion spring (not shown) received in a casing 5, 5', between two flanges 6, 6' provided on the bar-like member 2, 2'.

The bar-like members 2, 2' of U-shaped section rest on a carrier beam 7 of rectangular section, with the legs of the U engaging around the upper side of said carrier beam 7.

At the mutually facing ends of the bar-like members 2, 2' said members are provided with a recess 8, 8', these recesses being formed in both legs of the U. The carrier beam 7 is provided with projecting pins 9, 9', which are received by the recesses 8, 8'.

At the mutually remote ends of the bar-like members 2, 2' said members are provided with upstanding flanges 10, 10' in which openings are formed. These flanges 10, 10' cooperate with upstanding flanges 11, 11', which are also provided with openings and which are formed on the carrier beam 7, so that bolts, on which nuts 12, 12' are screwed, can be passed through the coinciding openings in the pairs of flanges 10, 11; 10', 11'.

The beam 7 is mounted between two sliding sleeves 13, 13' slidingly engaging around the legs 14, 14' of the frame of a conveyor belt. The sleeves 13, 13' are adjustable in height by means of threaded spindles 15, 15', so that the whole scraper device is adjustable in height, the threaded spindles 15, 15' being supported at their other ends by the longitudinal members 16' of the conveyor belt frame.

In addition, FIG. 1 also shows the return roller 17 and the conveyor belt 18 guided around it. By means of the spindles 15, 15' the carrier beam 7 is moved upwards until the scraper blades 4, 4' bear resiliently, through the action of the torsion springs received in the casings 5, 5', against the lower face of the lower run 18' of the conveyor belt.

Figure 2:
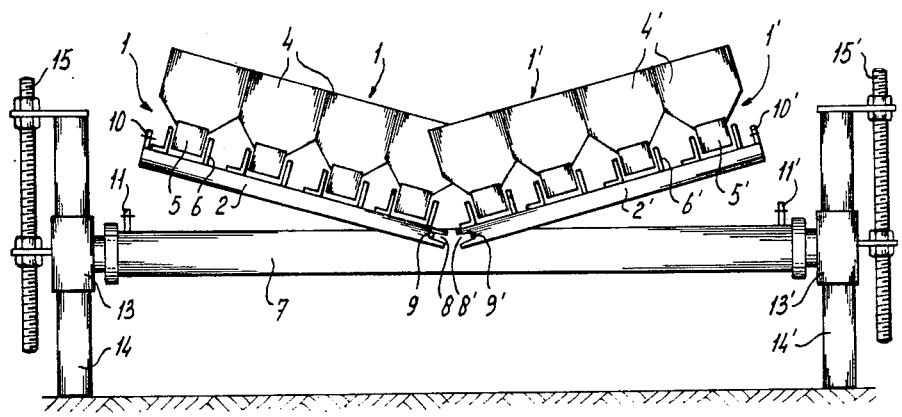
FIG. 2 is a front view of the scraper device shown in FIG. 1, during a dismantling phase.

When the scraper elements 1 have to be removed, for example in order to enable one or more of the scraper blades 4 to be replaced, the nuts 12, 12' are unscrewed and the bolts are pulled out of the coinciding openings in the pairs of flanges 10, 11; 10', 11', whereupon, as shown in FIG. 2, the bar-like members 2, 2' can be tipped up and the recesses 8, 8' then disengaged from the pins 9, 9', so that the bar-like members 2, 2', together with the scraper elements 1, 1' mounted on them, can be removed in a very simple manner from the carrier beam 7, whereupon new bar-like members can be fastened, once again in a simple manner but this time in the reverse sequence, on the carrier beam 7. All possible repair work can then be done in a workshop on the removed scraper elements 1, 1', whereupon the reconditioned units 1, 2, 3, 4, 5, 6 will again be ready for use.

I claim:

1. Scraper device for fitting to an endless conveyor belt or similar device having a frame, said scraper device comprising:

a set of scraper elements for scraping the lower face of a lower run of a conveyor, said scraper elements being divided into two groups each of which has a plurality of scraper blades and which lie substantially next to one another, an elongate carrier member which extends transversely of the longitudinal direction of said conveyor belt and mounted on said frame of the conveyor belt, two bar-like members for supporting a respective group of scraper elements, resting on an upper face of said carrier member in line with and adjacent one another, fastening means, arranged at the mutually facing ends of said bar-like members, comprising at least two elements which are formed respectively on the carrier member and on mutually facing ends of the bar-like member and which interengage in such a manner that a relatively slight displacement of a bar-like member in a direction away from the element formed on the carrier member will enable said elements to be brought out of engagement with one another, and fastening means at the mutually remote ends of the two bar-like members each so constructed that the afore-said slight displacement of a bar-like member is possible only after the remote end fastening means have been detached.

2. A scraper device according to claim 1 wherein said carrier member is formed by a beam having a rectangular section, and each bar-like member is formed by a bar having a U-shaped cross-section, this bar engaging around the upper side of said carrier beam with the legs of the U directed downwards.

3. A scraper device according to claim 2, wherein said elements of said fastening means at the mutually facing ends of said bar-like members are formed respectively by at least one pin projecting from a side edge of said carrier beam and at least one recess formed in a leg of said bar-like member U, starting from an end face of said bar-like member, in which recess said pin is received.

4. A scraper device according to claim 3, wherein said other fastening means, at the mutually remote ends of said bar-like members, are each formed by an upstanding flange which is formed on said bar-like member and is provided with an opening which lies next to a flange formed on said upper face of said carrier beam also provided with an opening, wherein securing means are inserted through the coinciding opening in said respective flanges for securing said flanges relative in position.

* * * * *